United States Patent [19]

Gray et al.

[11] 4,081,005

[45] Mar. 28, 1978

[54] FLEXIBLE LEAD CHLORIDE CATHODE CONSTRUCTION

[75] Inventors: Thomas J. Gray, Halifax; Jan Wojtowicz, Dartmouth; Max Baker, Halifax, all of Canada

[73] Assignee: Her Majesty the Queen in right of Canada, as represented by the Minister of National Defence, Canada

[21] Appl. No.: 717,455

[22] Filed: Aug. 24, 1976

[30] Foreign Application Priority Data

Feb. 2, 1976  Canada .................................. 244744

[51] Int. Cl.² ............................................ H01M 7/00
[52] U.S. Cl. ..................................... 141/32; 118/423; 118/428; 118/429; 29/623.5; 429/225

[58] Field of Search ............................ 141/1.1, 32, 33; 118/419, 423, 428, 429, 422, 117, 60; 29/623.5; 429/225

[56] References Cited

U.S. PATENT DOCUMENTS 3,779,056  12/1973  Padjen et al. ...................... 118/429

Primary Examiner—Houston S. Bell
Attorney, Agent, or Firm—Stevens, Davis, Miller & Mosher

[57] ABSTRACT

The present invention relates to flexible electrode material, preferably lead chloride, and to a method and apparatus for the continuous manufacture thereof. Such electrode material is useful in sea water batteries for sonobuoys.

10 Claims, 1 Drawing Figure

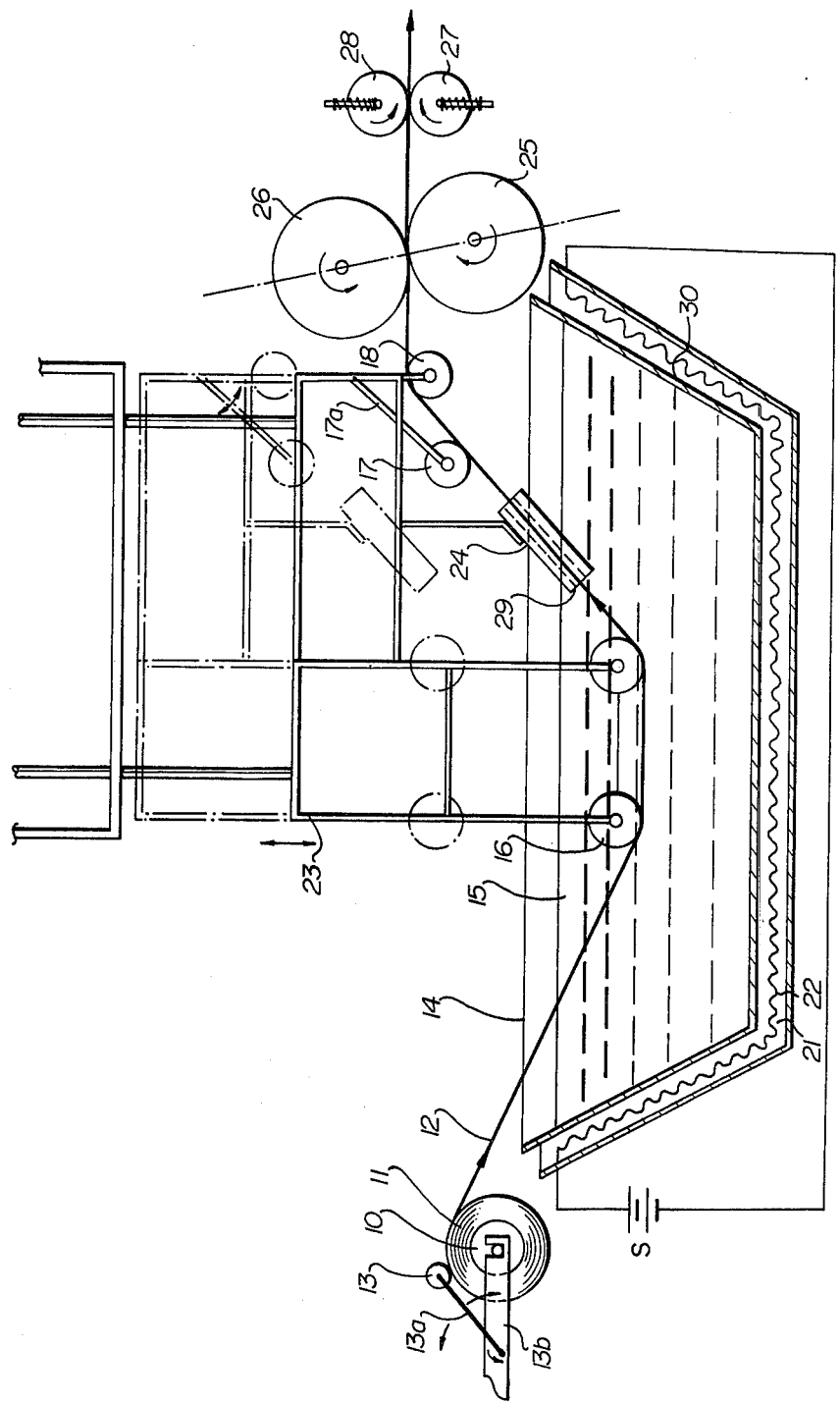

FLEXIBLE LEAD CHLORIDE CATHODE CONSTRUCTION

The present invention relates to flexible electrode material, suitable, for example, for use in the manufacture of salt water batteries, and to methods of and apparatus for the continuous manufacture of electrode material.

Electrodes are conventionally manufactured by mixing lead chloride powder with a binder and with carbon or other electrically conductive material, and then compacting the mixture around both sides of a metallic conductor, e.g. copper or nickel gauze, perforated sheet or expanded metal.

However, the necessity to include conducting material and a binder in the mixture reduces the amount of active material which can be included in the electrode, and therefore reduces the electrical efficiency of the electrode.

Furthermore, this prior, conventional process for the manufacture of battery electrodes requires considerably expenditure of labour and may involve difficulties in quality control.

In U.S. Pat. No. 4,016,339 there is disclosed a method of forming a battery electrode structure which comprises placing an open-mesh electrically conductive support structure in the form of a copper wire screen in a mold, and casting a mass of electrically active material in the mold around the support structure, the electrically active material comprising, for example, lead chloride.

In another of applicant's co-pending Canadian applications Ser. No. 229,399, filed June 16, 1975, there is disclosed a similar method on apparatus for forming a flexible electrode material. The present method and apparatus allows for a smoother and thicker coating of the electrode material. The apparatus is also simpler and cheaper to construct and operate.

It is an object of the present invention to provide a novel and improved method and apparatus for manufacturing flexible electrode material by a continuous process.

It is another object of the invention to provide a novel and improved method and apparatus for manufacturing flexible electrode material with a thicker and smoother coating.

According to the present invention, there is provided a method for the continuous manufacture of flexible electrode material which comprises the steps of; providing a bath of molten electrode coating material, guiding a strip-shaped mesh from a supply position, through the bath and upwardly from the bath to cause the coating material to become deposited on the mesh; and cooling the coating material deposited on the mesh after the mesh has passed through the bath.

Preferably, the mesh comprises woven wire gauze, perforated sheet metal or expanded sheet metal, made of copper, and the coating material comprises lead chloride.

When the coating material has been cooled sufficiently to effect solidification thereof, the electrode material may be cut into pre-determined lengths, or coiled, e.g. on a spool, as desired.

The present invention further provides apparatus for the manufacture of flexible electrode material, which comprises an open-topped container for a bath of molten coating material, means associated with the container for heating and melting the coating material, first guide means for supporting a roll of strip-shaped mesh material above and adjacent one end of the container, second guide means for guiding said strip-shaped material on a path of travel extending downwardly from the first guide means, and into the container, third guide means above and adjacent the other end of the container for guiding the strip-shaped material upwardly from said second guide means, and out of the container, means for lowering said second guide means from an elevated position above the container through the open top of the container to an operating position within the container in which a portion of the strip-shaped material is immersed in the bath; and drive means for advancing the strip-shaped material past the first, second and third guide means.

The invention will be more readily understood from the following description of a preferred embodiment thereof given, by way of example, with reference to the accompanying drawing, which is a schematic side view of apparatus in operation for forming flexible lead chloride electrode material.

Referring specifically to the drawing, a first guide means in the form of a supply spool 10 is provided above and adjacent one end of an open-topped tank 14, for carrying a coil 11 of strip-shaped material, conveniently in the form of a gauze of a suitable metal or a suitable expanded metal, preferably, a woven copper wire gauze 12. The spool 10 is rotatably mounted on a support arm 13b.

In operation, the woven copper gauze 12 extends from the supply roller 11 on the spool 10 downwardly into the open-topped tank 14 containing a bath of molten material 15, preferably, lead chloride; around the underside of a second guide means in the form of two submerged spaced, freely-rotatable graphite rollers 16, the spacing of which may be adjusted to vary the path length in the molten material; upwardly out of the bath of molten material 15 at an exit angle which may be varied to control the run-back of molten material and hence the thickness of the coating, conveniently, of about 45°; and over a third guide means in the form of a freely-rotatable guide roller 18 mounted on the carriage 23; along a substantially horizontal path between a pair of driven, slightly spaced water-cooled rollers 25 and 26 to expedite solidification of the lead chloride coating on the gauze 12; and through the nip of a pair of spring-biased rollers 27 and 28 with knurled surfaces. The roller 27 is driven by a drive means comprising a variable speed motor (not shown) to control the speed of advance of the gauze 12 through the apparatus. The coated strip material may be collected by any convenient means downstream of the driven roller 27.

The open-topped tank includes angled sides 30 to allow for flexibility of exit angle of the gauze 12 from the bath 15.

The provision of two guide rollers 16 allows for a sufficient path length in the bath 15 to permit the temperature of the gauze to increase somewhat while in the bath, resulting in a more complete coating of the gauze 12.

The gauze 12 is maintained under tension during operation of the apparatus by means of a heavy freely-rotatable roller 13 which rests against the coil 11. The roller 13 is rotatably mounted on one end of a linking arm 13a which, in turn, is pivotably mounted at its other end of a support arm 13b. Tension is maintained due to the weight of the roller 13.

A roller 17 is rotatably mounted on one end of a linking arm 17a, the other end of which is pivotably mounted on the carriage 23 and is maintained in the illustrated position by the tension of the gauze. The roller 17 is provided for spreading and smoothening the molten coating over the surface of the gauze 12 prior to solifification.

The open-topped tank is also provided with a heating-means, conveniently, in the form of a heat-insulating jacket 21 containing electrical resistance heating elements 22 which are energized by an electrical power source S. A means 24 is provided in the area of exit of the coated gauze 12 from the bath 15 to prevent the deposition of scum, which tends to form on the surface of the bath due to surface oxidation thereof, on the gauze 12. Specifically, means 24 comprises a sheltered passage including an inlet below the surface of the bath and an outlet above the surface of the bath, being defined by a rectangular block provided with an opening 29 therethrough. In the operating position, the block 24 is partially submerged in the bath 15 in such a manner that the gauze 12 exists the bath 15 through the opening 29. The block 24 is mounted on the carriage 23, and may be pre-heated by means not shown to reduce solidification prior to smoothening and distribution of the coating over the surface of the mesh by roller 17.

The freely rotable graphite rollers 16 as well as rollers 17 and 18 are mounted on a carriage 23 which is provided with means (not shown) for raising and lowering the carriage such that the rollers 16 and means 24 may be raised out of and lowered into the bath 15.

A fume hood including exhaust fans (not shown) is provided over the apparatus to exhaust toxic lead chloride fumes arising form surface oxidation of the bath. The fumes are directed to a water-spray scrubbing unit (not shown) before being exhausted to the atmosphere.

In operation of the above described appartus, the electric resistance heating elements 22 are energized to pre-heat the lead chloride until the latter becomes molten and the mesh 12 is threaded onto the system of rollers with the apparatus in the elevated position, that is, above the bath. The carriage 23 is then lowered from the elevated position to the operating position shown in the drawing, such that the rollers 16 are submerged in the bath of molten material 15 to enable the mesh 12 to be guided along a path therethrough; and such that the block 24 is partially submerged in the bath 15 in the area of exit of the mesh from the bath.

The mesh 12 exits from the bath 15 at an angle which may be varied by adjustment of the positioning of the roller 18, and is guided past the remaining rollers as defined above.

The mesh is kept under tension by means of roller 13 which is now positioned as in the drawing.

The driven roller 27 must be activated before or shortly after the mesh is lowered into the bath to prevent corrosion of the gauze by the bath.

The energization of the electric resistance heater elements 22 is controlled to maintain the temperature of the molten lead chloride within the range of about 510° to about 600° C, the fusion point of lead chloride being about 501° C.

It was found that the following parameters affect the thickness of the coating obtained:
(1) varying the speed of advance of the mesh through the apparatus
(2) varying the temperature of the bath of molten material
(3) varying the exit angle of the mesh from the bath
(4) varying the roughness and size of the openings in the substrate mesh, and
(5) quick cooling and solidification of the coatings.

Parameters 2 to 5 are first specified to minimize runback of coating material. The thickness of the coating material may then be sufficiently controlled by varying the speed of advance of the mesh through the bath.

More specifically, the amount of lead chloride deposited on the mesh 12 may be increased by increasing the speed of travel of the mesh 12, and thus the speed of rotation of the roller 27. However, the speed of advance must be sufficient to prevent corrosion or melting of the mesh.

It was found that the heaviest coatings were achieved when the bath temperature was kept just above the melting point of lead chloride. This is apparently due to the viscosity of the molten lead chloride. Specifically, since viscosity decreases as the temperature increases, if the bath is maintained just above the melting point of lead chloride a higher viscosity will result than if the temperature of the bath was higher. The higher viscosity reduces the run-back of molten material from the mesh. Thus, a bath temperature of about 525° C is preferred. However, temperatures of up to about 600° C will also produce useful electrode material, but with lighter deposition of coating. As mentioned above, the exit angle may be varied by adjusting the position of roller 18 to control the amount of run-back of molten material. Conveniently, an angle of about 45° was chosen.

It was also found that the run-back of coating material could be minimized by providing cooling rollers i.e. water-cooled by tap water.

In addition, the size of the copper gauze, when employed as the mesh, is also an important factor in determining the amount of lead chloride which will be deposited. Gauzes having a greater roughness or larger openings will be capable of picking up a heavier loading of lead chloride. However, there may be an upper limit on the mesh size which will not enable it to retain the coating.

Therefore, for very heavy load chloride coatings, it may be necessary to use expanded or perforated sheet metal substrates instead of woven wire gauze. However, the less expensive gauze is preferred when it is required to minimize the cost of production.

Successful results have been obtained, for example, using copper gauzes of 32-28 mesh size, made from wire of 0.007-0.012 inch diameter. The width of the gauzes may be from 2-6 inches depending upon the requirement, and the processing speed may be in the range of about 2.5 ft/min to about 100 ft/min., the molten lead chloride bath temperature being held at about 510°-600° C, preferably at about 525° C.

Electrodes obtained by this process were flexible and could readily be rolled into a cylindrical diameter of about 1 centimeter. The lead chloride coating adhered quite well to the gauze, although the electrode material is intentionally flexed in a repeated back and forth manner, it was found that the coating would eventually crack and loosen.

Wider gauzes, for example, 4 to 6 inches, are generally used in view of an "edge effect" which causes uneven coating at the edges of the gauze. Thus, if the requirement is for a 3 inch electrode, the edges may be cut off to eliminate the unevenly coated portion of the mesh.

Table 1 contains results of coverage of lead chloride coatings on a 4½ inches, 28 mesh, 0.012 diameter copper wire gauze at a bath temperature of about 525° C.

TABLE 1

| COVERAGE gm/cm$^2$ | SPEED ft/min |
| --- | --- |
| .61 | 62 |
| .52 | 55 |
| .20 | 35 |
| .12 | 20 |

The flexible electrode material obtained as described above was examined to determine its suitability for use in sea water batteries for sonobuoys, and electrodes containing a coating of about 0.23 gm/cm$^2$ were found to be capable of discharge for about 4–5 hours under conditions appropriate to sonobuoy battery applications. More heavily coated electrodes (i.e. about 0.6 gm/cm$^2$) discharged for up to 20 hours at sonobuoy battery rates.

While lead chloride has referred to as the coating material employed in the illustrated apparatus, it will be appreciated by those skilled in the art that other coating materials, such as copper chloride, silver chloride or a mixture thereof with lead chloride, which melts without decomposition and which has a melting point lower than that of the metal of the mesh, usually copper, may be employed.

We claim:

1. Apparatus for the manufacture of flexible electrode material, comprising:
   (a) an open-topped container for a bath of molten coating material,
   (b) means associated with the container for heating and melting the coating material,
   (c) first guide means for supporting a roll of strip-shaped material above and adjacent one end of the container,
   (d) second guide means for guiding said strip-shaped material on a path of travel extending downwardly from said first guide means and into the container,
   (e) third guide means above and adjacent the other end of said container for guiding the strip-shaped material upwardly from the second guide means and out of the container,
   (f) means for lowering said second guide means from an elevated position above the container through the open top of the container to an operating position within the container in which a corresponding portion of the strip-shaped material is immersed in the bath; and
   (g) drive means for advancing the strip-shaped material past the first, second and third guide means.

2. Apparatus as claimed in claim 1, including means for maintaining the strip-shaped material under tension.

3. Apparatus as claimed in claim 2, wherein the second guide means comprises a pair of horizontally spaced freely-rotatable guide rollers mounted on a carriage which is movable vertically between an elevated position above the container to an operating position within the container.

4. Apparatus as claimed in claim 3, wherein the third guide means is a freely-rotatable roller positioned to guide the strip-shaped material upwardly from the second guide means at an angle of about 45°.

5. Apparatus as claimed in claim 4, including means for quick-cooling of the coated strip-shaped material after exit from the bath, said means comprising a pair of driven, water-cooled rollers located downstream of the third guide means.

6. Apparatus as claimed in claim 1, wherein the drive means comprises a variable speed motor to control the speed of advance of the strip-shaped material.

7. Apparatus as claimed in claim 5, including means for spreading and smoothening of the coating material after exit from the bath, said means comprising a freely-rotatable roller positioned upstream of said third guide means.

8. Apparatus as claimed in claim 7, including means provided in the area of exit of the coated strip-shaped material from the bath to prevent deposition of scum on the material.

9. Apparatus as claimed in claim 8, wherein said means comprises a sheltered passage having an inlet below the surface of the bath and an outlet above the surface of the bath.

10. Apparatus according to claim 1, capable of handling strip-shaped material of 2–6 inches in width.

* * * * *